(12) United States Patent
Wüst

(10) Patent No.: US 12,220,878 B2
(45) Date of Patent: Feb. 11, 2025

(54) PIPE JOINT APPLICATOR AND METHOD FOR PRODUCING A JOINT

(71) Applicant: Swiss Tech Innovation AG, Olten (CH)

(72) Inventor: Theodor Wüst, Rüti (CH)

(73) Assignee: Swiss Tech Innovation AG, Olten (CH)

( * ) Notice: Subject to any disclaimer, the term of this patent is extended or adjusted under 35 U.S.C. 154(b) by 378 days.

(21) Appl. No.: 17/613,637

(22) PCT Filed: Jun. 12, 2020

(86) PCT No.: PCT/EP2020/025281
§ 371 (c)(1),
(2) Date: Nov. 23, 2021

(87) PCT Pub. No.: WO2020/249265
PCT Pub. Date: Dec. 17, 2020

(65) Prior Publication Data
US 2022/0227070 A1    Jul. 21, 2022

(30) Foreign Application Priority Data
Jun. 14, 2019   (DE) ...................... 10 2019 116 326.9

(51) Int. Cl.
*B29C 65/00* (2006.01)
*B29C 65/08* (2006.01)
(Continued)

(52) U.S. Cl.
CPC .......... *B29C 66/9512* (2013.01); *B29C 65/08* (2013.01); *B29C 65/16* (2013.01);
(Continued)

(58) Field of Classification Search
CPC ............ B29C 66/9512; B29C 66/5221; B29C 66/73921; B29C 66/9121; B29C 66/9141;
(Continued)

(56) References Cited

U.S. PATENT DOCUMENTS 4,918,292 A   4/1990 Nussbaum et al.
5,620,625 A   4/1997 Sauron et al.
(Continued)

FOREIGN PATENT DOCUMENTS

CN   1030886 A   2/1989
CN   103118832 A   5/2013
(Continued)

OTHER PUBLICATIONS

Translation of Written Opinion in PCT/EP2020/025281, Jan. 15, 2021 (Year: 2021).*

*Primary Examiner* — George R Koch
(74) *Attorney, Agent, or Firm* — Smartpat PLC

(57) ABSTRACT

The disclosure relates to a pipe joint applicator with a control device and a method for producing a joint between a first pipe element and a second pipe element. The pipe joint applicator with a control device thereby detects actual process parameters via means for actual value detecting. The pipe joint applicator with a control device and the method determines therefrom the target process parameters for process control means for controlling the process parameters to be delivered to a pipe joint to be made. The pipe joint applicator with a control device optionally compares at least one actual value of the process parameters to at least one target process parameter and, in the event of deviation from at least one tolerance value range, issues an alarm to the user and/or generates an error protocol.

6 Claims, 5 Drawing Sheets

(51) Int. Cl.
    *B29C 65/16*         (2006.01)
    *B29C 65/78*         (2006.01)
    *F16L 47/02*         (2006.01)

(52) U.S. Cl.
    CPC ...... *B29C 65/7805* (2013.01); *B29C 65/7832* (2013.01); *B29C 66/5221* (2013.01); *B29C 66/73921* (2013.01); *B29C 66/9121* (2013.01); *B29C 66/9141* (2013.01); *B29C 66/9221* (2013.01); *B29C 66/942* (2013.01); *B29C 66/9516* (2013.01); *B29C 66/961* (2013.01); *F16L 47/02* (2013.01); *F16L 2201/10* (2013.01); *F16L 2201/30* (2013.01); *F16L 2201/60* (2013.01)

(58) Field of Classification Search
    CPC .............. B29C 66/9221; B29C 66/942; B29C 66/9516; B29C 66/961
    See application file for complete search history.

(56) References Cited

U.S. PATENT DOCUMENTS

| | | | |
|---|---|---|---|
| 5,788,789 A * | 8/1998 | Cooper | B23K 13/025 |
| | | | 219/241 |
| 6,164,106 A * | 12/2000 | Nghiem | B21D 39/04 |
| | | | 72/20.1 |
| 6,430,979 B1 | 8/2002 | Meier | |
| 2003/0230131 A1 | 12/2003 | Bowles et al. | |
| 2009/0299514 A1 | 12/2009 | Williams et al. | |
| 2010/0019471 A1 | 1/2010 | Ruckle et al. | |
| 2012/0230771 A1 | 9/2012 | Farley et al. | |
| 2013/0284342 A1* | 10/2013 | Lidstrom | B29C 66/81875 |
| | | | 156/359 |
| 2017/0009917 A1* | 1/2017 | Wüst | F16L 17/10 |
| 2018/0340554 A1 | 11/2018 | Hutchison et al. | |

FOREIGN PATENT DOCUMENTS

| | | | | |
|---|---|---|---|---|
| CN | 103282709 A | 9/2013 | | |
| CN | 108799238 A | 11/2018 | | |
| DE | 19631019 | 8/1997 | | |
| DE | 10354166 A1 | 6/2005 | | |
| DE | 112009001330 | 4/2011 | | |
| EA | 024646 B1 | 10/2016 | | |
| EP | 1079955 A1 | 9/1999 | | |
| EP | 3120064 A1 | 9/2018 | | |
| EP | 3409954 A1 | 12/2018 | | |
| GB | 2474241 A * | 4/2011 | ......... | B23K 37/0533 |
| GB | 2477773 A | 8/2011 | | |
| JP | H0972482 A | 3/1997 | | |
| JP | 2002297707 A | 10/2002 | | |
| JP | 2005016722 A | 1/2005 | | |
| JP | 2017516043 A | 6/2017 | | |
| RU | 2113352 C1 | 6/1998 | | |
| RU | 2496290 C2 | 10/2013 | | |
| RU | 2561942 C2 | 9/2015 | | |
| RU | 2675959 C2 | 12/2018 | | |
| WO | 0055512 A1 | 9/2000 | | |
| WO | 2010071589 A1 | 6/2010 | | |
| WO | 2011150341 A2 | 12/2011 | | |
| WO | 2012038551 A1 | 3/2012 | | |
| WO | 2012093959 A1 | 7/2012 | | |

* cited by examiner

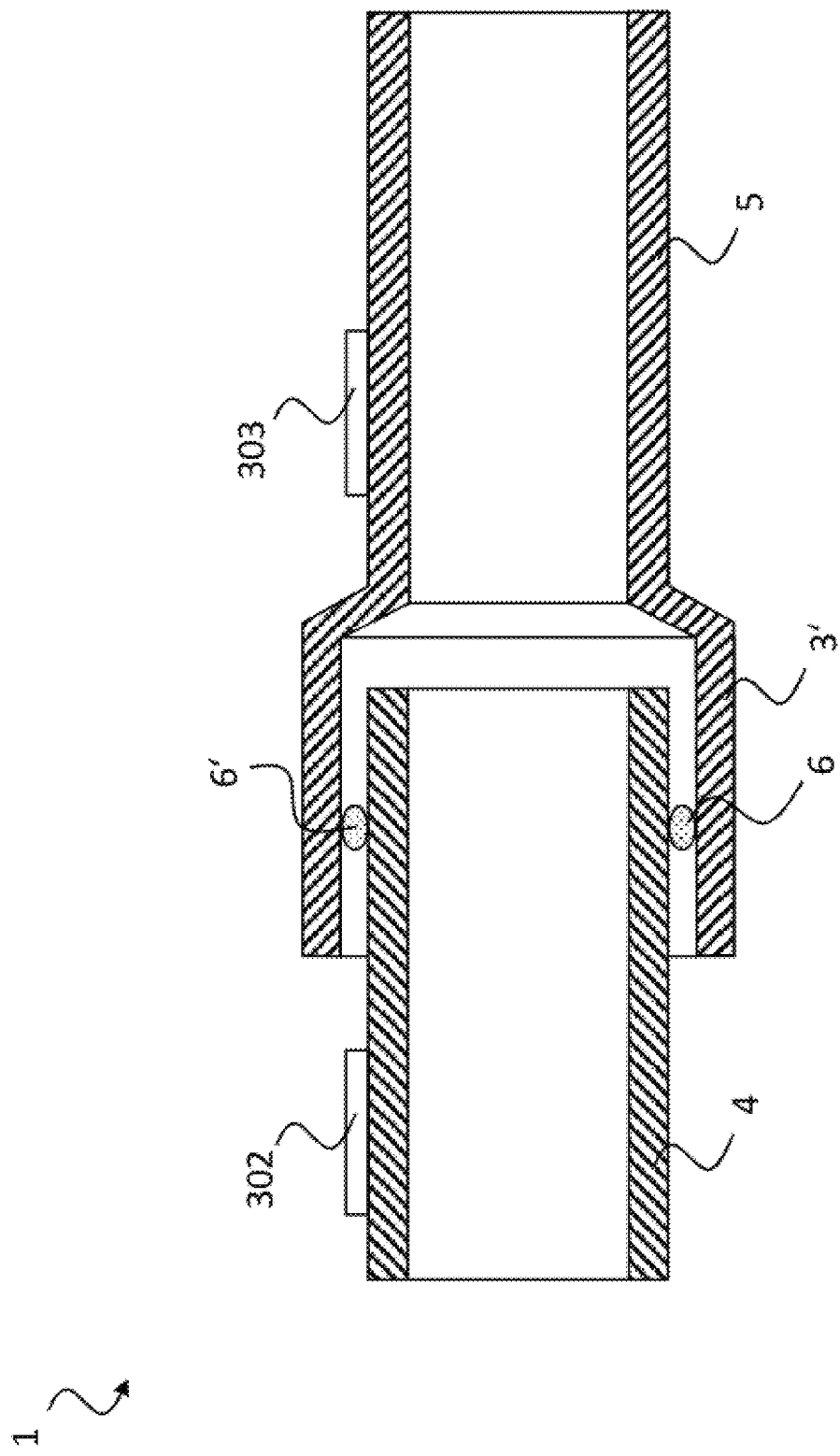

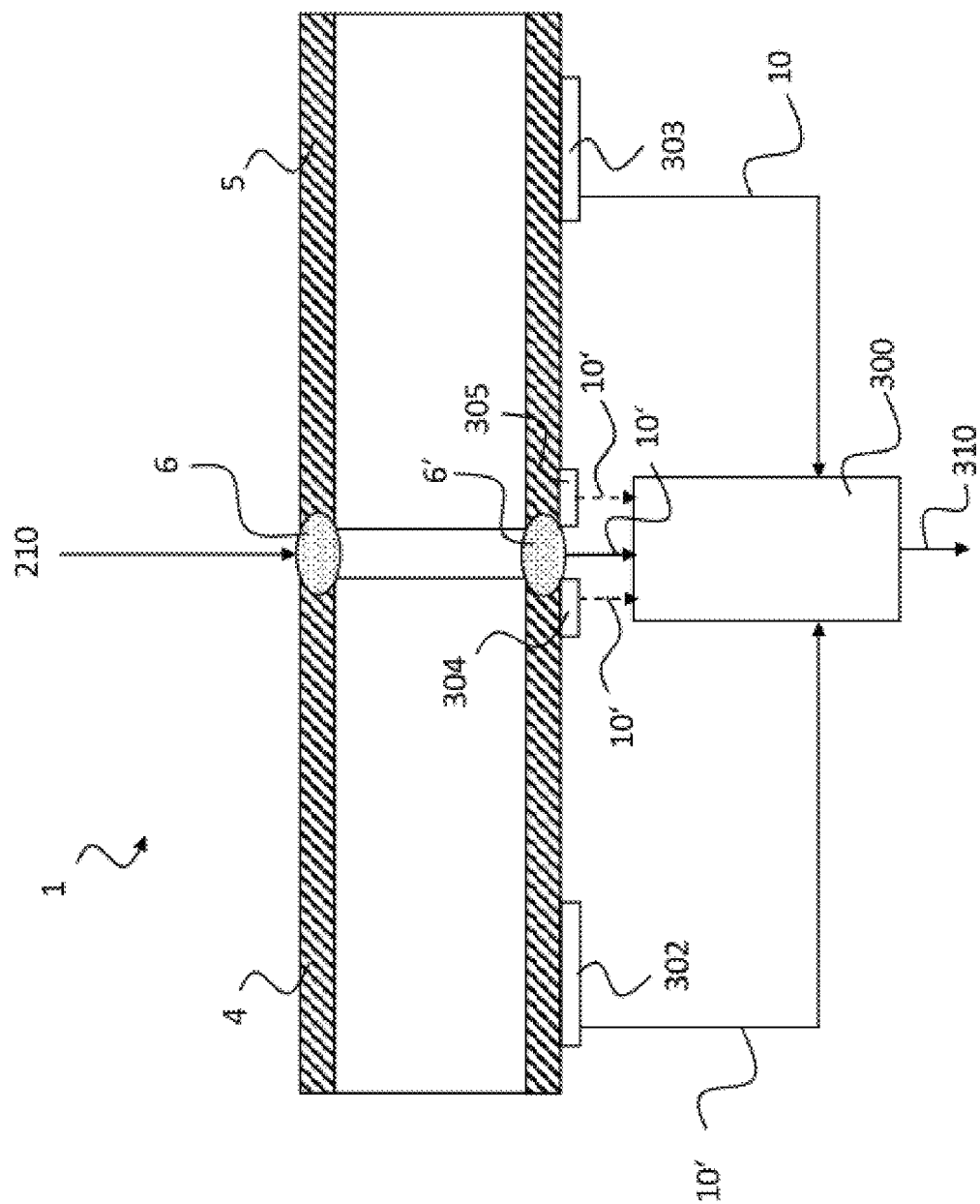

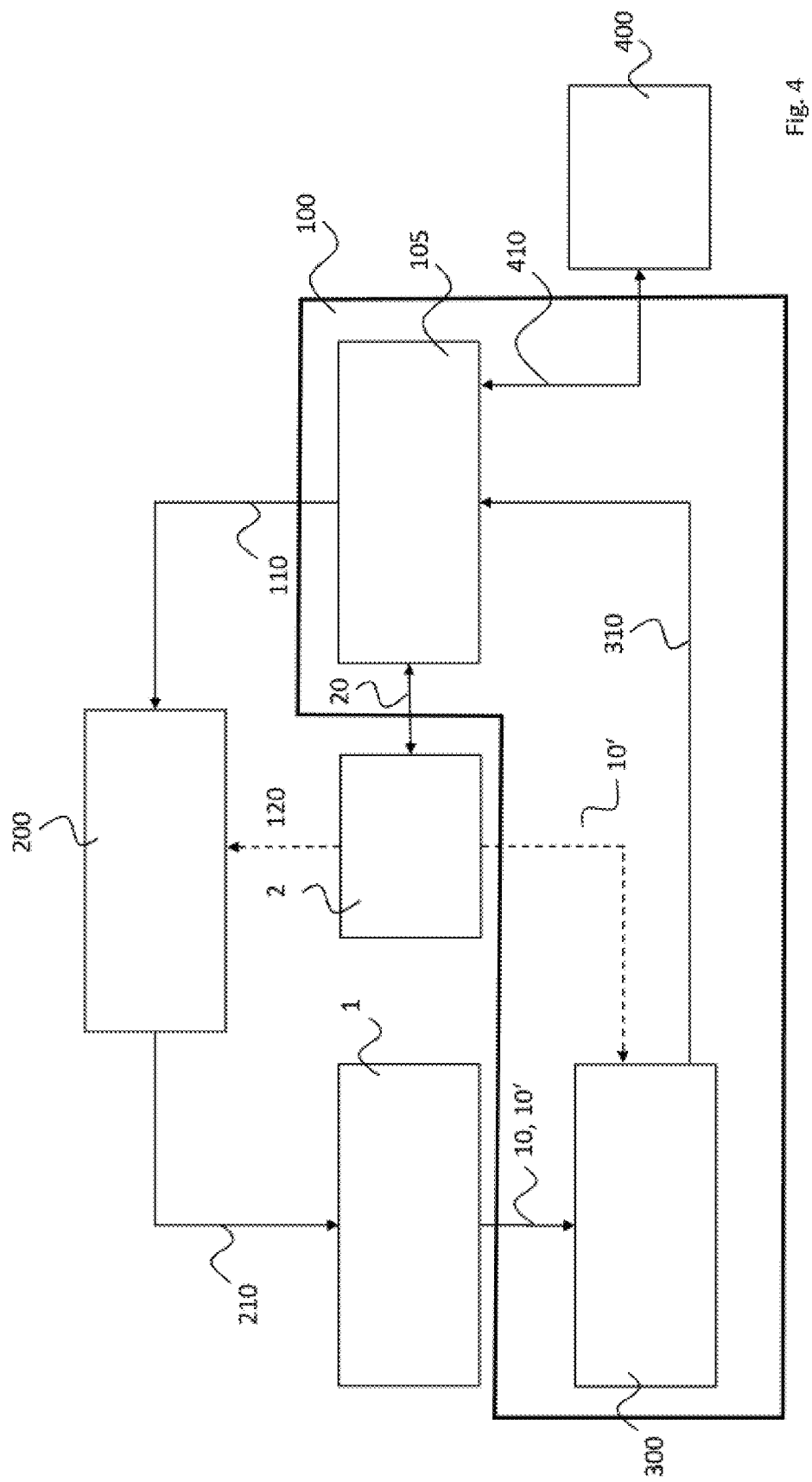

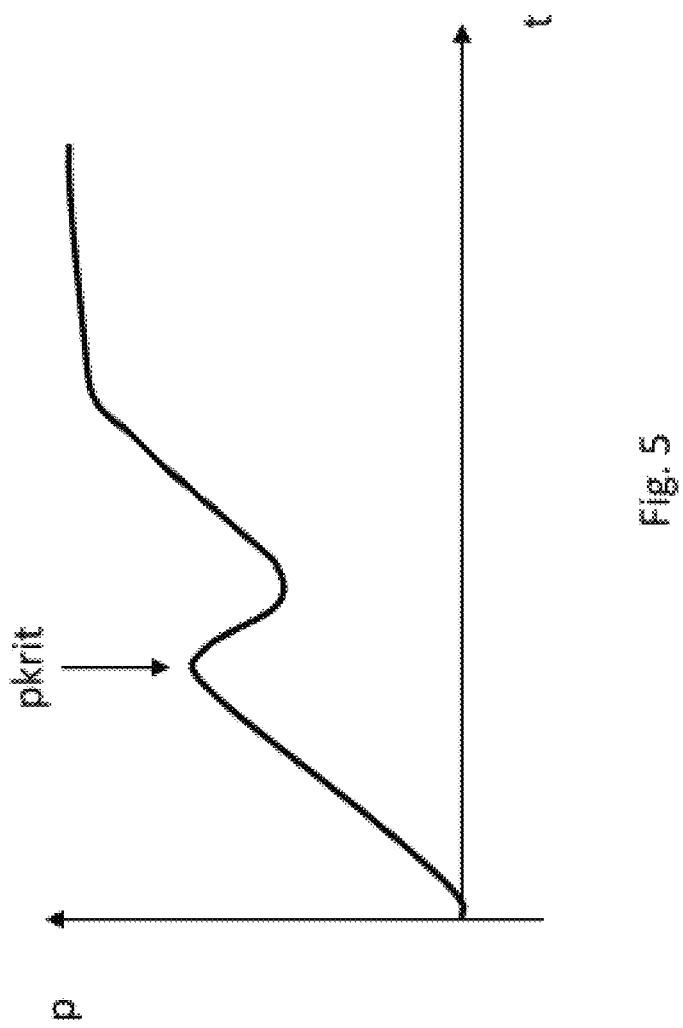

PIPE JOINT APPLICATOR AND METHOD FOR PRODUCING A JOINT

This application is a 371 of PCT/EP2020/025281, filing date Jun. 12, 2020.

TECHNICAL FIELD

The disclosure relates to a pipe joint applicator with a control device and a method for producing a joint between a first pipe element and a second pipe element. Pipe joints are required for the joint of individual pipe elements to form a connected longer and possibly bent pipe in which, after completion, a fluid medium is held or transported under defined pressure.

BACKGROUND

Pipe joints are produced using sleeves and various joining techniques. Known connection techniques are for example:
- screwing and sealing with hemp or a Teflon tape or by screw/clamp connections, for example according to the "WIROFLEX" system,
- welding, for example autogenous, electric, laser or ultrasonic,
- soldering, for example by hard soldering or soft soldering,
- clamping, for example as described in European patent EP 3 120 064 B1,
- pressing,
- shrinking by means of heat and/or cold,
- rubbing,
- bonding by means of single- or multi-component adhesives.

The known jointing techniques require very different process parameters depending on the material and dimensions of the pipe ends to be joined and on the operating conditions of the finished pipe joint. Since in practice the joints are often made manually on site by an installer, the quality of the joint depends very much on the skill and experience of the installer. Subjective characteristics, such as the shape of the day and/or environmental influences often affect the quality of the joint, which means that consistent quality cannot be guaranteed.

SUMMARY

The disclosed pipe joint applicator overcomes the disadvantages of the state of the art and enables easy-to-use, fast, safe and traceably documentable assembly and, if necessary, disassembly of pipe connections.

This is accomplished by a pipe joint applicator with a control device as claimed and by a method for producing a joint between a first pipe element and a second pipe element as claimed.

A pipe joint applicator with a control device can provide target process parameters for controlling process control means for producing a pipe joint. The pipe joint applicator with a control device thereby detects actual process parameters via means for actual value detecting.

The pipe connection region in terms of the present disclosure comprises a butt joint connected in self-substance manner of a first pipe element with a second pipe element or a sleeve.

A sleeve is either a component which accommodates one end of a first pipe element and one end of a second pipe element or a defined extension of the inside diameter at the end of a second pipe element into which one end of a first pipe element can be inserted, thus initially not yet permanently joining the first pipe element to the second pipe element.

A permanent pipe joint can be produced after an initially not yet permanent pipe joint has been produced via means for producing a permanent pipe joint. Optionally, the pipe joint can be designed to be detachable again.

The means for producing a permanent pipe joint and/or detachable pipe joint between two pipe ends can be controlled by a process control means. The process control means may comprise, for example, force- or torque-controlled means for closing or opening screw connections, force- or torque-controlled means for closing or opening clamping sleeves, controllable welding devices or controllable soldering devices, mechanically, hydraulically, pneumatically or electrically controllable shrinking or pressing devices, in particular also those for actuating plug-in sleeves operating according to European patent EP 3 120 064 B1 or adhesive metering and holding devices for joining two pipe ends.

The pipe joint applicator with a control device can optionally determine in each case on the one hand the physical actual process parameters of the components of a pipe joint, for example the type and/or the material as well as the dimensions of the sleeve and/or of the first pipe element and/or of the second pipe element, the temperature, and/or the air pressure and/or the air humidity at the sleeve and/or at the first pipe element and/or optionally at the second pipe element and/or the position of the first pipe element and optionally of the second pipe element with respect to the position of the sleeve, determining therefrom, on the other hand, the target process parameter of at least one process parameter to be delivered by a process control means to the pipe joint to be produced and the course of the process parameters to be delivered, that is the defined time course in sign and amount and, if appropriate, the chemical composition and/or physical composition of at least one of the process parameters delivered by the process control means for producing a permanent pipe joint and/or detachable pipe joint of a first pipe element with a second pipe element. Alternatively or additionally, the target process parameter of at least one of the process parameters to be output by a process control means to the pipe joint to be created may be manually specified to the process control means by a user directly or via the pipe joint applicator using a control device.

The pipe joint applicator with a control device can optionally comprise
- personal data/identifier of the user producing the pipe joint,
- date, time and geographical position of the pipe joint made and can monitor, via means for actual value detecting, continuously or at defined time intervals, the actual course (actual value) thereby achieved of at least one of the process parameters to be delivered to the pipe joint.

Target process parameters comprise, for example, electrical, mechanical, hydraulic, and/or pneumatic signals for operating a process control means for controlling the controllable means for producing a permanent and/or detachable pipe joint, in particular a resultant pressure or pressure profile over time applied to the means for closing or opening compression joints.

The target process parameters can either be output directly to the process control means by the pipe joint applicator with a control device or the target process parameters can be output manually to the process control means by a user via an optional manual interface under specification of the target process parameters determined by the pipe joint applicator with a control device. The determining of the target process parameters by the pipe joint applicator with a control device is advantageously performed via an interface for input by the user and/or for output to the user or via an interface to a computer and via an output device of the computer, for example a display and/or a loudspeaker or a headset of a communication means such as a smartphone.

Process control means are, for example, a screw actuator, for example a cordless screwdriver or an otherwise electrically or pneumatically or hydraulically operated screw-driving tool with a defined controllable torque and a defined torque curve, a compressed air generator with a defined controllable working pressure and a defined working pressure curve within a fluid pressure medium for example, a mechanically operable metering gun connected to a pressure vessel with a fluid pressure medium under defined pressure, or an electrically or pneumatically or hydraulically operable compressed air valve, or a hand compressor, or a disposable or reusable cartridge, or a pressure cartridge, a hydraulic pressure generator with a defined controllable working pressure and a defined working pressure curve within a fluid pressure medium, an actuator comprising a mechanically, electrically, pneumatically or hydraulically controllable valve for controlling the flow and/or the pressure of a fluid pressure medium, in particular a generator and/or an actuator for generating a pressure and a defined pressure curve, for example a pulse or another time curve within a fluid pressure medium for controlling a plug-in sleeve according to European patent EP 3 120 064 B1, an adhesive metering device with controllable concentration and quantity of a single- or multi-component adhesive, a controllable feed device with defined control of the position of a pipe component with respect to the position in the pipe connection region a soldering device with controllable temperature and controllable temperature profile, a welding device with controllable temperature and temperature profile and optionally with controllable supply of a welding electrode and optional control of a shielding gas supply, a laser welding device with controllable temperature and temperature profile or an ultrasonic welding device with controllable temperature and temperature profile, optionally with controllable working frequency and/or working amplitude.

The process control parameters to be delivered by a process control means to the pipe joint to be produced for controlling the controllable means for producing a permanent pipe joint and/or detachable pipe joint of two pipe ends may optionally comprise the feed rate for producing a defined depth of penetration of a first pipe element and/or a second pipe element into the sleeve or a defined depth of penetration of the first pipe element into the sleeve provided by the second pipe element or for producing a defined distance between a first pipe element to be butt-jointed and a second pipe element, the torque between the sleeve and a first pipe element and/or second pipe element acting screw joint, for example produced by an electrically, pneumatically or hydraulically operated manual screwdriver with a screwdriver attachment suitable for the means for producing the permanent pipe joint, the pneumatic and/or hydraulic control pressure of a fluid for controlling a clamping action of the means for producing the permanent pipe joint, for example for a plug-in sleeve operating in accordance with European patent EP 3 120 064 B1, applied, for example, via a mechanically controllable compressed-air gun or an electrically, pneumatically or hydraulically controllable compressed-air valve for controlling compressed air which is supplied from a compressed-air tank via a compressed-air hose, the material composition of a joining agent such as the composition of a welding electrode, its feed and/or a shielding gas composition or a solder and/or a flux, the heat supplied or dissipated to produce a defined temperature at a controllable means for producing force-locking and/or form-locking connection and/or joint connected in self-substance manner, for example a welded or soldered joint or a shrink-fit connection, the mixing and/or metering of adhesive components of an adhesive joint, frequency, amplitude, distance and temporal profile of an ultrasonic welding device for plastics, amplitude, distance and temporal profile of a laser welding device for plastic material.

Preferably, the pipe joint applicator with a control device can optionally access a tolerance band stored for the respective setpoint combination, compare the respective actual value with the tolerance band of the setpoint, and output an alarm to the user and/or store an error protocol when an actual value deviates from the setpoint tolerance. Output to the user may be via a display on the pipe joint applicator with a control device, such as an interface for input from the user and/or output to the user, or via smartphone, or via a nearby or remote printer, or by transmitting and storing the data to a nearby or remote computer, such as via smartphone.

Advantageously, the pipe joint applicator with a control device comprises an optional electronic control unit in addition to the option of manual operability.

The optional control unit can advantageously comprise a computer with data and program memory and/or an interface to a computer, a smartphone and/or a server for controlling the process parameters and for controlling the setpoints and detecting the actual value of at least one process parameter.

The control unit may comprise an interface to and from the user and/or an interface to a local or remote computer, via which inputs to the control unit for controlling the pipe joint applicator with a control device are possible and outputs and storing of result values from the pipe joint applicator with a control device to the user and/or to a local or remote computer are possible. A remote computer may be, for example, a server accessible via the Internet or a computer accessible via LAN or WLAN.

The setpoints and their tolerances may be stored in the control unit in a data memory or in a local or remote computer, for example as a lookup table or as a data record in a relational database. The remote computer can be a local computer connected to the pipe joint applicator via a wired interface or wireless interface with a control device, or a smartphone or tablet PC, or a remote server connected via a local area network (LAN) or via a wide area network (WAN) and the Internet.

An optional control unit may comprise interfaces to and from optional sensors for determining and controlling the process parameters (setpoints) to be delivered to the pipe joint being created and for detecting the process parameters (actual values) delivered to the pipe joint being created.

The pipe joint applicator with a control device may comprise means for metering the set point of the process parameters and means for detecting the actual value of the process parameters.

The set point can optionally be set by a user or it is determined by a control unit of the pipe joint applicator with control device and provided as a set point for the process parameter.

The control unit comprises an analog computer with at least one input and output interface or advantageously a digital computer with signal processor, program memory, data memory and at least one input and output interface.

The means for actual value detecting optionally comprises sensors for detecting the material properties and/or dimensions of the pipe elements to be joined. This data is provided, for example, via identification means, which may be attached to the sleeve and/or to one or both of the pipe elements to be joined, or it may be retrieved by the user from a database or entered manually. The sensors may comprise, for example, barcode scanners, RFID receivers, or an input keyboard, or an interface to a computer such as a tablet PC or smartphone for retrieving this data from a database or for manually detecting the material properties and/or dimensions of the pipe elements to be joined.

The means for actual value detecting further comprises sensors for detecting the actual values of the process parameters applied to the controllable means for producing a permanent and/or detachable pipe joint of a first and/or a second pipe element with respect to the process parameters applied in the pipe connection region.

The sensors for detecting the actual values can optionally comprise a pressure sensor for detecting the pressure of a fluid medium for controlling the controllable means for producing a permanent and/or detachable pipe joint, in particular a resultant pressure or pressure profile over time of a fluid medium applied to the means for closing or opening clamping sleeves. Preferably, the clamping process is controlled by monitoring the pressure curve in the cavity of the sleeve, for example at the connection point for applying a fluid pressure medium to a sleeve.

The sensors for detecting actual values may optionally comprise an acoustic/electric vibration transducer or mechanical/electric vibration transducer within a frequency range of 5 Hz to 100 kHz for detecting structure-borne sound and/or temporal structure-borne sound progression and/or spatial sound and/or temporal spatial sound progression in the pipe connection region during control of the controllable means for producing a permanent and/or detachable pipe joint in the pipe connection region.

The sensors for detecting the actual values can optionally comprise a force sensor and/or a torque sensor for detecting the controlling force or torque applied to the means for closing or opening the force-locking and/or form-locking connection of the pipe ends or the force or torque over time.

The sensors for detecting actual values may optionally comprise a temperature sensor for detecting temperature or temperature profile during control of the controllable means for producing a permanent pipe joint and/or detachable pipe joint in the pipe connection region.

In particular, the temperature sensor can advantageously comprise an infrared radiation sensor or a thermal image sensor for detecting the temperature without contact.

The sensors for detecting the actual values can optionally comprise an ultrasonic transmitter and an ultrasonic receiver for detecting mechanical stresses in the material of the pipe elements in the area of the pipe joint.

The sensors for detecting the actual values can optionally comprise an X-ray transmitter and an X-ray receiver for detecting mechanical stress profiles in the material of the pipe elements in the area of the pipe joint.

The sensors for detecting the actual values can optionally comprise an optoelectronic sensor for detecting the absolute position of the pipe ends in space and/or for detecting the relative position of the pipe ends to one another and/or for detecting the relative position of at least one of the pipe ends to the sleeve. Optical markings can be applied to the pipe ends for support. In addition to the frequency range of the visible light spectrum, the optoelectronic sensor can also comprise the frequency range of non-visible infrared or ultraviolet radiation. Optical markings may comprise absolute and or relative bar codes on the pipe ends to determine the position of the pipe ends.

The sensors for detecting the actual values can optionally comprise an inductive sensor and/or a capacitive sensor and/or a magnetic sensor for detecting the absolute position of the pipe ends in space and/or for detecting the relative position of the pipe ends to one another and/or for detecting the relative position of at least one of the pipe ends to the sleeve. Inductive, capacitive or magnetic markings can be applied to the pipe ends for support. Inductive, capacitive or magnetic markings may comprise absolute and or relative bar codes on the pipe ends for determining the position of the pipe ends.

For contactless detection of the ends of plastic pipes, a metal body, for example a metal ball or a metal strip, can advantageously be attached as an indicator to one or both pipe ends of the pipe elements to be joined and/or in the sleeve at a defined point. Advantageously, the metal body changes its position until the correct position is reached or when a pipe element reaches a correct position. This change in position can be detected directly or from outside through the wall of a pipe or the sleeve inductively, capacitively or magnetically via a proximity sensor.

The sensors for detecting the actual values can optionally comprise a sensor for optical coding or text recognition, for example a barcode scanner, a camera, a character reader or the like for detecting material properties and/or dimensions of the pipe ends to be joined. Advantageously, the information is attached to the pipe elements to be joined via marking means, for example as a barcode or as characters.

The sensors for detecting the actual values can optionally comprise an RFID reader for detecting material properties and/or dimensions of the pipe ends to be joined. The information is advantageously attached to the pipe elements to be joined via marking means, for example as an RFID tag.

The sensors for detecting the actual values may optionally comprise a GPS sensor for detecting the position of the created pipe joint in three-dimensional space with respect to the reference system earth and optionally a timer for detecting a time stamp in order to be able to document an assignment to the space and time of the created pipe joint, in particular in the case of complex and extended pipe systems. The timer can optionally access a radio-controlled time signal or a time base of the control unit or a nearby or remote computer.

The sensors for detecting the actual values can optionally comprise means for detecting the user's personal identification data, such as an RFID reader, a magnetic stripe reader, a barcode reader, or an input keyboard for entering a PIN or other user identification.

In an advantageous embodiment, the pipe joint applicator may be integrated with a control device in a cordless screwdriver or in a hand compressor, or may be designed as an attachment on a cordless screwdriver or on a hand compressor.

The pipe joint applicator with a control device is applied in the following steps:

detecting information used to identify pipe elements and optionally a sleeve, for example material composition, nominal size, manufacturer, serial number or type of joint to be produced, determining target process parameters for controlling a process control means, applying the process parameters to controllable means for producing a permanent pipe joint and/or detachable pipe joint of a first pipe element and/or a second pipe element, optionally detecting the actual values of the process parameters applied to the controllable means for producing a permanent pipe joint and/or detachable pipe joint of a first pipe element and/or a second pipe element, optional comparison of the actual values of the process parameters applied to the controllable means for producing a permanent pipe joint and/or detachable pipe joint of a first pipe element and/or a second pipe element with a tolerance band for the set values of the process parameters, optionally outputting the result to a user via a display device and/or optionally documenting the result in a data storage device or via an output device such as a printer.

Optionally, the following additional steps are advantageously carried out to supplement the documentation:

detecting personal identification data of a user detecting and storing the time and/or the geographical position at the moment the joint is established.

The pipe joint applicator with a control device enables easy-to-use, fast, safe and traceably documentable assembly and, if necessary, disassembly of pipe joints. The pipe joint applicator with a control device thus enables the monitoring, quality assurance and documentation of any connection point of two pipe ends. It is irrelevant which type of joint to be produced, such as butt welding, soldering, gluing of the pipe elements to be joined or welding, soldering, gluing, screwing or clamping or deforming using a sleeve to join the pipe elements, and which raw materials are involved. The data is detected immediately at the place and time when the joint is created.

Thus, the pipe joint applicator with a control device and the method for producing a joint between a first pipe element and a second pipe element are advantageously applicable to all types of pipe joint systems with butt joint or with sleeves, in particular for plug-in sleeves, which are embodied according to European patent EP 3 120 064 B1.

BRIEF DESCRIPTION OF THE DRAWINGS

In the following, embodiments of the invention are described with reference to figures. These figures show:

FIG. 2 as a sectional view of a pipe joint with two pipe ends and a sleeve integrated in one pipe end, FIG. 3 as a sectional view of a pipe joint with two pipe ends and a butt joint connected in self-substance manner, FIG. 4 as a block diagram of the integration of a pipe joint applicator with a control device into a system for creating a pipe joint by means of a sleeve, FIG. 5 the basic nominal pressure curve in the cavity of a plug-in sleeve according to European patent EP 3 120 064 B 1.

DETAILED DESCRIPTION

Figure 1:
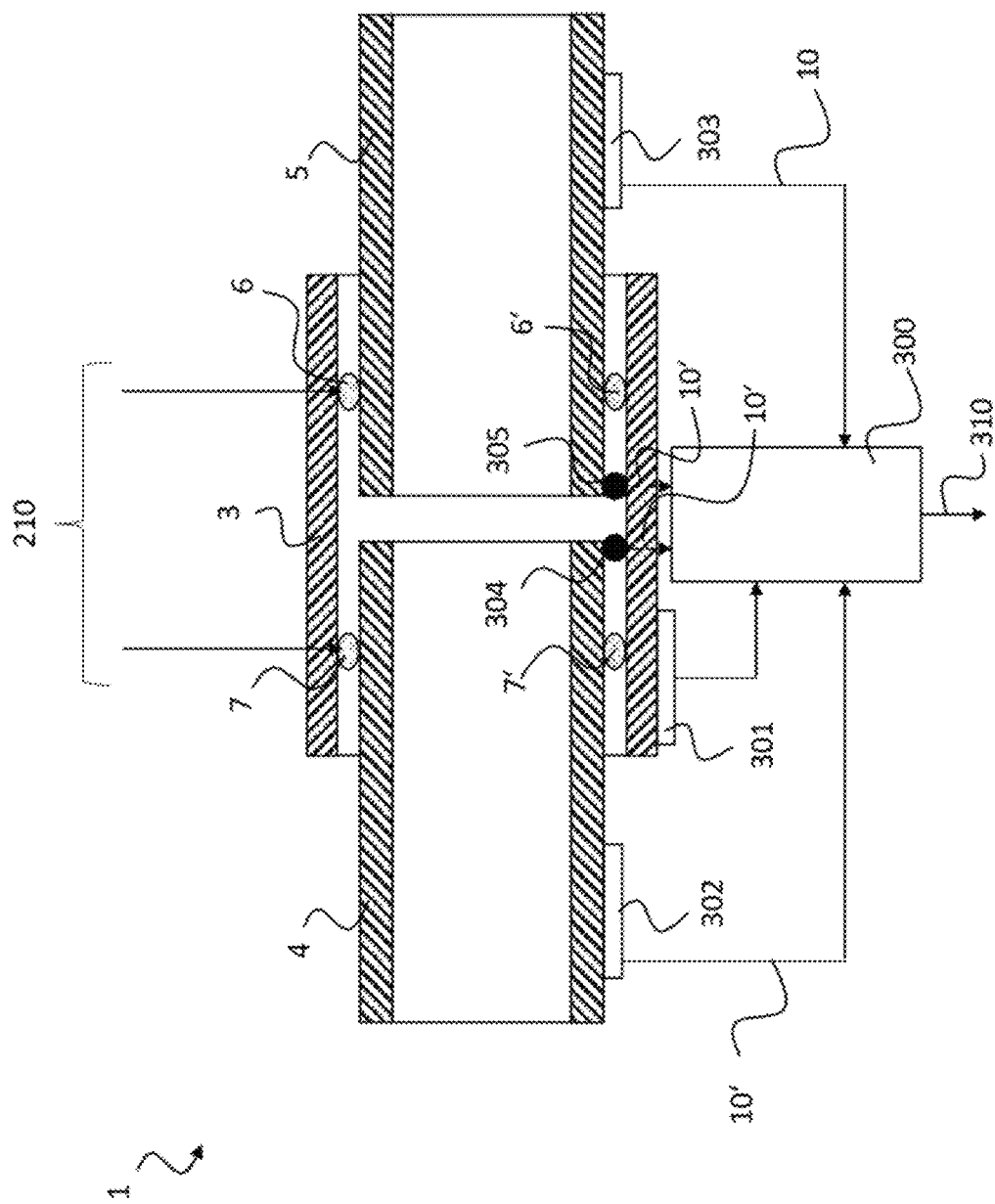
FIG. 1 as a sectional view of a pipe joint with two pipe ends and a sleeve.

Embodiments of the present disclosure are described below by way of example only. These examples represent the best ways of putting the invention into practice that are presently known to the applicant, although of course these are not the only ways in which this could be accomplished. The description sets forth the functions of the example and the sequence of steps for designing and operating the example. However, the same or equivalent functions and sequences may be obtained from other examples.

FIG. 1 shows a sectional view of a pipe joint with two pipe ends and a sleeve. To produce a pipe joint 1, a first pipe element 4 and a second pipe element 5 are initially not yet permanently inserted into a sleeve 3. The actual value of the current position is thereby determined by means for actual value detecting 300. The means for actual value detecting 300 comprise sensors for detecting the actual values optionally an optoelectronic sensor (not shown) for absolute position detecting of the pipe ends of the first pipe element 4 and the second pipe element 5 in space and/or for relative position detecting of the pipe ends of the first pipe element 4 and the second pipe element 5 to each other and/or for relative position detecting of at least one of the pipe ends of the first pipe element 4 and the second pipe element 5 to the sleeve 3. Optical markings (not shown) may be attachable to the pipe ends of the first pipe element 4 and the second pipe element 5 for support. The optoelectronic sensor can thereby comprise the frequency range of the visible light spectrum as well as the frequency range of the non-visible infrared or ultraviolet radiation. Optical markings may comprise absolute and or relative bar codes on the pipe ends of the first pipe element 4 and the second pipe element 5 for determining the position of the pipe ends relative to each other and for determining the position of the pipe ends of the first pipe element 4 and the second pipe element 5 relative to the sleeve 3.

The sensors for detecting the actual values optionally comprise an inductive sensor and/or a capacitive sensor and/or a magnetic sensor (not shown) for absolute position detection of the pipe ends of the first pipe element 4 and of the second pipe element 5 in space and/or for relative position detection of the pipe ends of the first pipe element 4 and of the second pipe element 5 with respect to each other and/or for relative position detection of at least one of the pipe ends of the first pipe element 4 and of the second pipe element 5 with respect to the sleeve 3. Inductive, capacitive or magnetic markings (not shown) can be applied to the pipe ends for assistance. Inductive, capacitive or magnetic markings may comprise absolute and or relative codes on the pipe ends for determining the position of the pipe ends.

For contactless detection of the ends of plastic pipes, a metal body, for example a metal ball or a metal strip, can be attached as a means for position detection 304, 305 at a defined point on one or both pipe ends of the first pipe element 4 and the second pipe element 5 of the pipe elements to be joined and/or in the sleeve 3. Advantageously, the means for position detection 304, 305 changes its position until the correct position is reached or when a correct position of a pipe element 4, 5 is reached. This change in position can be detected as an actual value of the process parameters 10' directly or from outside through the wall of a pipe 4, 5 or the sleeve 3 inductively, capacitively or magnetically via a proximity sensor within the means for actual value detecting 300.

The means for position detection 304, 305 are also advantageously applicable in the case of a butt joint of a first pipe element 4 with a second pipe element 5, according to FIG. 3.

The pipe joint applicator with a control device 100 comprises in the pipe connection region for a contactless detection of the ends of plastic pipes at one or both pipe ends of the first pipe element 4 and the second pipe element 5 of the pipe elements to be connected and/or in the sleeve 3 at least one means for position detection 304, 305, wherein the means for position detecting 304, 305 changes its position until the correct position is reached or when a correct position of a pipe element 4, 5 is reached, and the change in position is detected inductively, capacitively or magnetically as an actual value of the process parameters 10' via a proximity sensor within the means for actual value detecting 300.

A sleeve 3 is either a component which accommodates one end of a first pipe element 4 and one end of a second pipe element 5, or a sleeve 3' formed by a defined widening (shown in FIG. 2) of the inside diameter at the end of a second pipe element 5, into which an end of a first pipe element 4 can be inserted and thus in each case joins the first pipe element 4 to the second pipe element 5, initially not yet permanently.

A permanent pipe joint is produced after an initially not yet permanent pipe joint has been produced via means for producing a permanent pipe joint 6, 6', 7, 7'. Optionally, the pipe joint can be detachable again.

The means for producing a permanent pipe joint and/or detachable pipe joint comprise process control means 200 (shown in FIG. 4) for producing a force-locking connection and/or form-locking connection and/or material-locking connection of two pipe elements 4, 5 by means of a sleeve 3, for example force- or torque-controlled means for closing or opening screw connections, force- or torque-controlled means for closing or opening clamping sleeves, controllable welding devices or controllable soldering devices, mechanically, hydraulically, pneumatically or electrically controllable shrinking or pressing devices, in particular also plug-in sleeves operating according to European patent EP 3 120 064 B1 or adhesive metering and holding devices for joining two pipe elements.

The process control means 200 (shown in FIG. 4) generates the process parameters 210 defined for producing a permanent joint, depending on the type of joint to be produced.

The process parameters 210 to be supplied by the process control means 200 to the pipe joint 1 to be produced for controlling the controllable means for producing a permanent and/or detachable pipe joint 6, 6', 7, 7' of two pipe elements 4, 5 by means of a sleeve 3 comprise for example
the feed for producing a defined depth of penetration of a first pipe element 4 and/or a second pipe element 5 into the sleeve 3 or a defined depth of penetration of the first pipe element 4 into the sleeve 3' provided by the second pipe element 5,
the torque between the sleeve 3, 3' and a first pipe element 4 and/or second pipe element 5 acting screw joint, for example generated by an electrically, pneumatically or hydraulically operated manual screwdriver with a screwdriver attachment suitable for the means for producing the permanent pipe joint,
the pneumatic and/or hydraulic control pressure of a fluid for controlling a clamping action of the means for producing the permanent pipe joint 6, 6', 7, 7', for example for a plug-in sleeve operating in accordance with European patent EP 3 120 064 B1, applied, for example, via a mechanically or electrically controllable valve for controlling compressed air which is supplied from a compressed-air reservoir via a compressed-air hose, or supplied from a compressed-air cartridge,
the material composition of a joining agent, such as the composition of a welding electrode, its dosage and feed rate and/or a shielding gas composition, or the dosage and composition of a soldering agent and/or a flux,
the heat supplied or dissipated to produce a defined temperature at a controllable means for producing a permanent and/or detachable pipe joint 6, 6', 7, 7', for example by means of a force-fit joint and/or a form-fit joint and/or a material-fit joint, for example a welded or brazed joint,
the mixing and/or metering of adhesive components and, if necessary, the duration and intensity of the supply of curing radiation, such as ultraviolet light, for curing an adhesive joint,
frequency, amplitude, distance and temporal profile of an ultrasonic welding device for plastic,
amplitude, distance and temporal profile of a laser welding device for plastic.

The pipe joint applicator with a control device 100 (shown in FIG. 4) controls the process control means 200 for metering the process parameters 210 either directly via target process parameters 110 or by specifying the target process parameters 110 via the user 2 via an optional manual interface 120, and comprises means for actual value detection 300 of the process parameters 210. The means for actual value detecting converts the actual values 10, 10' of the process parameters into electrical actual values of the process parameters 310, which are fed back to the control unit 105 of the pipe joint applicator having a control device 100 for further processing.

The target process parameters 110 are either output directly to the process control means 200 by the pipe joint applicator with a control device 100, or the target process parameters 110 are output manually to the process control means 200 by a user 2 via an optional manual interface 120 while specifying the target process parameters 110 from the pipe joint applicator with a control device 100. The target process parameters 110 determined by the pipe joint applicator with a control device 100 are specified via an interface for input from the user and/or output to the user 20 or via an interface to a computer 410 and via an output device of a computer 400, for example, the display and/or speaker or headphones of a smartphone or tablet PC or via a display or output device such as a printer of the computer 400.

The target process parameter 110 can optionally be input by a user 2 via an interface for input from the user and/or output to the user 20 to the pipe joint applicator with a control device 100, or it is determined by a control unit 105 of the pipe joint applicator with a control device 100 and transmitted as the target process parameter 110 to the process control means 200 for generating the process parameter 210 to the controllable means for producing a permanent and/or detachable joint 6, 6', 7, 7' of a first pipe element 4 and/or a second pipe element 5, for example in the form of a force-locking joint and/or a form-fitting joint and/or a material-locking joint with respect to a sleeve.

The means for actual value detecting 300 optionally comprises sensors for detecting the material properties and/or dimensions of the pipe elements to be joined. This data is provided, for example, via identification means 301, 302, 303, which may be attached to the sleeve 3 and/or to one or both of the pipe elements 4, 5 to be joined, or it may be retrieved from a database or entered manually by the user 2. The sensors may comprise, for example, barcode scanners, RFID receivers or an input keyboard or an interface to a computer, such as a tablet PC or a smartphone for retrieving this data from a database or for manually detecting the material properties and/or dimensions of the pipe elements 4, 5 to be joined.

FIG. 2 shows a sectional view of a pipe joint with two pipe ends and a sleeve 3' integrated in one pipe end. A sleeve 3, 3' in the sense of this disclosure is either a component which accommodates one end of a first pipe element 4 and one end of a second pipe element 5 or a sleeve 3' formed by a defined widening of the inside diameter at the end of a second pipe element 5, into which an end of a first pipe element 4 can be inserted and thus in each case connects the first pipe element 4 to the second pipe element 5, initially not yet permanently. The embodiments in the description of FIG. 1 for sleeve 3 also apply mutatis mutandis to sleeve 3'.

FIG. 3 shows a sectional view of a pipe joint with two pipe ends and a butt joint. To produce a pipe joint 1, a first pipe element 4 and a second pipe element 5 are initially butt positioned at a defined distance. The actual value of the current position is determined by means for actual value detecting 300. The means for actual value detecting 300 comprise sensors for detecting actual values optionally an optoelectronic sensor (not shown) for absolute position detecting of the pipe ends of the first pipe element 4 and the second pipe element 5 in space and/or for relative position detecting of the pipe ends of the first pipe element 4 and the second pipe element 5 to each other. Optical markings (not shown) can be attached to the pipe ends of the first pipe element 4 and the second pipe element 5 for support. The optoelectronic sensor can thereby comprise the frequency range of the visible light spectrum as well as the frequency range of the non-visible infrared or ultraviolet radiation. Optical markings may comprise absolute and or relative bar codes on the pipe ends of the first pipe element 4 and the second pipe element 5 for determining the position of the pipe ends relative to each other.

The sensors for detecting the actual values 300 optionally comprise an inductive sensor and/or a capacitive sensor and/or a magnetic sensor (not shown) for absolute position detection of the pipe ends of the first pipe element 4 and the second pipe element 5 in space and/or for relative position detection of the pipe ends of the first pipe element 4 and the second pipe element 5 with respect to each other. Inductive, capacitive or magnetic markings (not shown) can be applied to the pipe ends for assistance. Inductive, capacitive or magnetic markings may comprise absolute and or relative codes on the pipe ends for determining the position of the pipe ends.

For contactless detection of the ends of plastic pipes, a metal body, for example a metal ball or a metal strip, can be attached as an indicator at a defined point on one or both pipe ends of the first pipe element 4 and the second pipe element 5 of the pipe elements to be joined as means for position detection 304, 305.

The means for position detection 304, 305 are advantageously applicable in particular also in the case of a butt joint of a first pipe element 4 with a second pipe element 5.

The pipe joint applicator with a control device 100 comprises in the pipe connection region therefor for contactless detection of the ends of plastic pipes at one or both pipe ends of the first pipe element 4 and the second pipe element 5 of the pipe elements to be connected at least one means for position detection 304, 305, wherein the means for position detection 304, 305 changes its position until the correct position of a pipe element 4, 5 is reached and the change in position is detected inductively, capacitively or magnetically as an actual value of the process parameters 10' via a proximity sensor within the means for actual value detection 300.

A permanent pipe joint is produced after producing an initially not yet permanent pipe joint by defined positioning of the first pipe element with respect to the second pipe element via means for producing a permanent pipe joint 6, 6'.

In this context, the means for producing a permanent pipe joint comprise process control means 200 (shown in FIG. 4) for producing a joint connected in self-substance manner between two pipe elements 4, 5 of controllable welding equipment or controllable soldering equipment, or controllable adhesive metering and holding devices for connecting two pipe elements.

The process control means 200 (shown in FIG. 4) generates the process parameters 210 defined for producing a permanent joint, depending on the type of joint to be produced.

The process parameters 210 to be delivered by the process control means 200 to the pipe joint 1 to be produced for controlling the controllable means for producing a permanent pipe joint 6, 6' of two pipe elements 4, 5 comprise for example the feed for producing a defined position of a first pipe element 4 and/or a second pipe element 5 in the pipe connection region the material composition of a joining agent such as the composition of a welding electrode, its dosage and feed and/or a shielding gas composition or the dosage and composition of a solder and/or a flux, the supplied or dissipated heat for producing a defined temperature at a controllable means for producing a permanent, material-locking pipe joint 6, 6', for example a welded or brazed joint, the mixing and/or metering of adhesive components and, if necessary, the duration and intensity of the supply of curing radiation, such as ultraviolet light, for curing an adhesive joint, frequency, amplitude, distance and temporal profile of an ultrasonic welding device for plastic, amplitude, distance and temporal profile of a laser welding device.

The pipe joint applicator with a control device 100 (shown in FIG. 4) controls the process control means 200 for metering the process parameters 210 either directly via target process parameters 110 or by presetting the target process parameters 110 via the user 2 via an optional manual interface 120, and comprises means for actual value detecting 300 the process parameters 210. The means for actual value detecting converts the actual values 10' of the process parameters into electrical actual values of the process parameters 310, which are fed back to the control unit 105 of the pipe joint applicator with a control device 100 for further processing.

The target process parameters 110 are either output directly to the process control means 200 by the pipe joint applicator with a control device 100, or the target process parameters 110 are output manually to the process control means 200 by a user 2 via an optional manual interface 120 while specifying the target process parameters 110 from the pipe joint applicator with a control device 100. The target process parameters 110 determined by the pipe joint applicator with a control device 100 are specified via an interface for input from the user and/or output to the user 20 or via an interface to a computer 410 and via an output device of a computer 400, for example, the display and/or speaker or headphones of a smartphone or tablet PC or via a display or output device such as a printer of the computer 400.

The target process parameter 110 may optionally be input by a user 2 via an interface for input from the user and/or output to the user 20 to the pipe joint applicator having a control device 100, or it may be determined by a control unit 105 of the pipe joint applicator having a control device 100 and provided as the target process parameter 110 to the process control means 200 for generating the process parameter 210 to the controllable means for producing a permanent material joint connected 6, 6' of a first pipe element 4 to a second pipe element 5.

The means for actual value detecting 300 optionally comprises sensors for detecting the material properties and/or dimensions of the pipe elements to be joined. This data is provided, for example, via identification means 302, 303, which may be attached to one or both of the pipe elements 4, 5 to be joined, or it may be retrieved from a database or manually entered by the user 2. The sensors may comprise, for example, a barcode scanner, a character recognizer, a camera, RFID receivers or an input keyboard or an interface to a computer, such as a tablet PC or a smartphone for retrieving this data from a database or for manually detecting the material properties and/or dimensions of the pipe elements 4, 5 to be joined.

FIG. 4 shows as a block diagram the integration of the pipe joint applicator with a control device 100 into a system for making a pipe joint. The pipe joint applicator with a control device 100 provides the target process parameters 110 for controlling a process control means 200 for producing a pipe joint 1. The pipe joint applicator with a control device 100 thereby detects actual process parameters 10, 10' via the means for actual value detecting 300.

A permanent pipe joint is produced after producing an initially not yet permanent pipe joint via means for producing a permanent pipe joint 6, 6', 7, 7' (shown in FIG. 1. FIG. 2 and FIG. 3). Optionally, the pipe joint is detachable again.

The means for producing a permanent and/or detachable pipe joint 6, 6', 7, 7' are thereby controlled by the process control means 200 for producing a permanent and/or detachable joint of two pipe ends. The process control means 200 comprises, for example, force- or torque-controlled means for closing or opening screw connections, force- or torque-controlled means for closing or opening clamping sleeves, controllable welding devices or controllable soldering devices, mechanically, hydraulically, pneumatically or electrically controllable shrinking or pressing devices, in particular also those for actuating plug-in sleeves operating in accordance with European patent EP 3 120 064 B1 or adhesive metering and holding devices for joining two pipe elements 4, 5.

The pipe joint applicator with a control device 100 determines on the basis of electrical actual values of the process parameters 310, which are output by the means for actual value detecting 300 from, for example, the marking means 301, 302, 303 (shown in FIG. 1 and FIG. 3) on the one hand the physical parameters of the components of a pipe joint 1, for example the type and/or the material as well as the dimensions of the sleeve 3, 3' and/or of the first pipe element 4 and/or of the second pipe element 5, the temperature, and/or the air pressure and/or the air humidity at the sleeve 3, 3' and/or at the first pipe element 4 and/or at the second pipe element 5 and/or the position of the first pipe element 4 and possibly of the second pipe element 5 with respect to the position of the pipe connection region, determining therefrom, on the other hand, the target process parameter 110 for at least one process parameter 210 to be delivered by the process control means 200 to the pipe joint 1 to be produced and the course of the process parameters 210 to be delivered to the pipe joint 1, that is the defined time course in sign and amount and, if appropriate, of the chemical and/or physical composition of at least one of the process parameters 210 delivered by the process control means 200 for producing a permanent and/or detachable pipe joint of a first pipe element 4 with a second pipe element 5. Alternatively or additionally, the target process parameter 110 of at least one of the process parameters 210 to be output by a process control means 200 to the pipe joint to be produced can be manually input by a user 2 to the pipe joint applicator with a control device 100 via the interface for input from the user and/or for output to the user 20 and is specified from there as the target process parameter 110 to the process control means 200 after appropriate processing taking into account the other process-relevant data.

Target process parameters 110 comprise, for example, electrical, mechanical, hydraulic or pneumatic signals for operating the process control means 200 to control the controllable means for producing a permanent and/or detachable pipe joint 6, 6', 7, 7', in particular a resultant pressure or pressure profile over time applied to the means for closing or opening clamping sleeves.

The process control means 200 comprises, for example, a screw actuator, for example a cordless screwdriver or an otherwise electrically or pneumatically or hydraulically operated screwdriving tool with a defined controllable torque and/or defined torque curve, a compressed air generator with a defined controllable working pressure and defined working pressure curve within a fluid pressure medium, for example a metering gun connected to a pressure vessel with a fluid pressure medium under defined pressure, or an electrically or pneumatically or hydraulically operable compressed air valve, or a manual compressor, or a disposable or reusable cartridge, or a pressure cartridge, a pneumatic or hydraulic pressure generator with a defined controllable working pressure and defined working pressure curve within a fluid pressure medium, an actuator comprising a mechanically, electrically, pneumatically or hydraulically controllable valve for controlling the flow rate and/or the pressure of a fluid pressure medium in particular a generator and/or an actuator for generating a pressure and a defined pressure curve, for example a pulse or another temporal curve within a fluid pressure medium for controlling a plug-in sleeve 3 according to European patent EP 3 120 064 B1, an adhesive metering device with controllable concentration and quantity of a single- or multi-component adhesive, a controllable feed device with defined control of the position of a pipe component 4, 5 with respect to the position in the pipe connection region, a soldering device with controllable temperature and temperature profile, a welding device with controllable temperature and temperature profile and optionally with controllable supply of a welding electrode and optional control of a shielding gas supply, a laser welding device with controllable temperature and temperature profile or an ultrasonic welding device with controllable temperature and temperature profile, optionally with controllable working frequency and/or working amplitude.

The process parameters 210 to be supplied by the process control means 200 to the pipe joint 1 to be produced for controlling the controllable means for producing a permanent and/or detachable pipe joint 6, 6', 7, 7' of two pipe elements 4, 5 are described by way of example in the description of FIG. 1 and FIG. 3.

The pipe joint applicator with a control device 100 uses the target process parameters 110 to control the process control means 200 to meter the process parameters 210, either directly or via specifications to the user 2.

The pipe joint applicator with a control device 100 comprises means for actual value detecting 300 of the process parameters 210. The means for actual value detecting 300 converts the actual values 10, 10' of the process parameters 210 into electrical actual values of the process parameters 310, which are fed back to the control unit 105 of the pipe joint applicator with a control device 100 for further processing.

The target process parameter 110 can optionally be input by a user 2 via the interface for input from the user and/or output to the user 20 to the pipe joint applicator with a control device 100, or it is determined by a control unit 105 of the pipe joint applicator with a control device 100 and provided as the target process parameter 110 to the process control means 200 for generating the process parameter 210 to the controllable means for producing a permanent and/or detachable joint 6, 6', 7, 7' of a first and/or a second pipe element 4, 5, for example in the form of a force-fit joint and/or a form-fit joint and/or a material-fit joint, is provided.

The means for actual value detecting 300 comprises sensors for detecting the material properties and/or the dimensions of the pipe elements 4, 5 and/or the sleeve 3, 3' to be joined. This data is provided, for example, via identification means 301, 302, 303 (shown in FIG. 1 and FIG. 3), which may be attached to the sleeve 3, 3' and/or to one or both of the pipe elements 4, 5 to be joined, or it may be retrieved by the user 2 from a database via an interface to the computer 410, or it may be entered manually via the interface for input from the user and/or output to the user 20. The sensors may comprise, for example, a barcode scanner, a character recognizer, a camera, an RFID receiver, or an input keyboard or interface 410 to a computer, such as a tablet PC or smartphone for retrieving this data from a database or for manually detecting the material properties and/or dimensions of the pipe elements 4, 5 to be joined.

In the illustrated example, the pipe joint applicator with a control device 100 comprises an interface to the computer 410 through which the pipe joint applicator with a control device 100 is connected to a nearby or remote computer 400.

In this example, the pipe joint applicator with a control device 100 comprises an electronic control unit 105 in addition to the option of manual operability by the user 2 via the interface for input from the user and/or output to the user 20 or via the optional manual interface 120.

The control unit 105 comprises an analog computer with at least one input and output interface or advantageously a digital computer with signal processor, program memory, data memory and at least one input and output interface 20, 410.

Advantageously, the control unit 105 comprises a computer with data and program memory and/or an interface to a computer 410, for example a smartphone, tablet PC and/or a server and/or via an interface for input from the user and/or output to the user 20 for controlling the process parameters 210 and for controlling the target process parameters 110 and via an interface for detecting the actual electrical values of the process parameters 310.

In this regard, the control unit 105 comprises interfaces to the sensors of the means for actual value detecting 300 and the interface for input from the user and/or output to the user 20.

The means for actual value detecting 300 comprises sensors for detecting the actual values of the process parameters 10, 10' of the process parameters 210 applied to the controllable means for producing permanent and/or detachable pipe joints 6, 6', 7, 7' of a first pipe element 4 and/or a second pipe element 5 with respect to a sleeve 3, 3'.

The sensors of the means for actual value detecting 300 can also detect personal data or the identification of the user 2 as the actual value of the process parameters 10,10', for example via an RFID reader, magnetic stripe reader, barcode reader or an input keyboard for entering a PIN or other user identification.

The sensors for detecting the actual values optionally comprise a pressure sensor for detecting the pressure of a fluid medium for controlling the controllable means for producing a permanent and/or detachable pipe joint 6, 6', 7, 7', in particular a resulting pressure or pressure curve over time of a fluid medium applied to the means for closing or opening clamping sleeves. Advantageously, the clamping process is controlled by monitoring the pressure curve in the cavity of the sleeve 3, 3', for example at the connection point for applying a fluid pressure medium to a sleeve 3, 3'.

The sensors for detecting the actual values advantageously comprise an acoustic/electric vibration transducer or mechanical/electric vibration transducer within a frequency range of 5 Hz to 100 kHz for detecting the structure-borne sound and/or the temporal structure-borne sound progression or the spatial sound and/or the temporal spatial sound progression in the pipe connection region during the control of the controllable means for producing a permanent and/or detachable pipe joint 6, 6', 7, 7' in the pipe connection region 1.

The sensors for detecting the actual values advantageously comprise a force sensor and/or a torque sensor for detecting the controlling force or the controlling torque applied to the means for producing a permanent and/or detachable pipe joint 6, 6', 7, 7' for closing or opening the force-locking and/or form-locking connection of the pipe ends or the force or torque curve over time. The force sensor and/or torque sensor can alternatively also be an integral part of the process control means 200, for example a cordless screwdriver or a hand compressor.

The sensors for detecting actual values advantageously comprise a temperature sensor for detecting the temperature or temperature profile during control of the controllable means for producing a permanent and/or detachable pipe joint 6, 6', 7, 7' in the area of the pipe joint 1.

In particular, the temperature sensor can advantageously comprise an infrared radiation sensor or a thermal image sensor for contactless detecting of the temperature.

The sensors for detecting the actual values optionally comprise an ultrasonic transmitter and an ultrasonic receiver for detecting mechanical stress profiles in the material of the pipe elements in the area of the pipe joint 1.

The sensors for detecting actual values optionally comprise an X-ray radiation transmitter and an X-ray radiation receiver for detecting mechanical stress profiles in the material of the pipe elements in the area of the pipe joint 1.

The sensors for detecting the actual values optionally comprise an optical barcode scanner for detecting material properties and/or dimensions of the pipe ends to be joined. The information is thereby advantageously attached to the pipe ends to be joined and/or to the sleeve 3, 3' via marking means 301, 302, 303 as a barcode.

The sensors for detecting the actual values optionally comprise an RFID reader for detecting material properties and/or dimensions of the pipe ends to be joined. The information is thereby advantageously attached as an RFID tag to the pipe elements 4, 5 to be joined and/or to the sleeve 3, 3' via marking means 301, 302, 303 as a barcode on the pipe ends to be joined and/or on the sleeve 3, 3'.

The sensors for detecting the actual values optionally comprise a GPS sensor for detecting the position of the created pipe joint in three-dimensional space with respect to the reference system earth and optionally a timer for detecting a time stamp in order to be able to document an assignment to the space and time of the created pipe joint, particularly in the case of complex and extended pipe systems.

The sensors for detecting the actual values optionally comprise means for detecting the user's personal identification data, such as an RFID reader, magnetic stripe reader, barcode reader, or input keyboard.

The sensors of the means for actual value detecting 300 convert the actual values of the process parameters 10, 10' into electrical actual values of the process parameters 310, which are further processed by the control unit 105 of the pipe joint applicator with control device 100.

Advantageously, the control unit 105 detects the date, the time and the geographical position of the manufactured pipe joint and, via the means for actual value detecting 300, detects continuously or at defined time intervals the actual variation of the electrical actual values of the process parameters 310 of at least one of the process parameters 210 to be delivered to the pipe joint 1.

The control unit 105 determines the target process parameters 110 for controlling the process control means 200 from the actual electrical values of the process parameters 310 and/or from input from the user 2 via the interface for input from the user and/or output to the user 20.

The control unit 105 of the pipe joint applicator with a control device 100 operates the interface to the computer 410 via the control unit 105, through which inputs from a local or remote computer 400 to the control unit 105 for controlling the pipe joint applicator with a control device 100 are possible, and outputs and storing of result values from the pipe joint applicator with a control device 100 to a local or remote computer 400 are possible. A nearby computer 400 may be a smartphone or tablet computer connected via a wired or wireless interface 410, and a remote computer 400 may be, for example, a server or computer accessible via a local area network (LAN) interface 410 or a wide area network (WAN) interface 410 and the Internet.

In this regard, the setpoints and their tolerances may be stored in the control unit 105 in a data store or in a nearby or remote computer 400, for example, as a lookup table or as a record in a relational database. The near or remote computer 400 may be a local computer or smartphone connected to the pipe joint applicator via a wired, or wireless interface with a control device 100, or a remote server connected via a local area network (LAN) or wide area network (WAN) and the Internet.

Advantageously, the pipe joint applicator with a control device 100 can optionally access a stored tolerance band of target process parameters 110 resulting for the particular type of joint to be made and combination of material characteristics, compares the respective actual value of the process parameters 10, 10' or the electrical actual value of the process parameters 310 with the tolerance band of the target process parameter 110, and in the event of deviation of an actual value from the target tolerance, outputs an alarm to the user 2 via the interface for input from the user and/or output to the user 20 and/or stores an error protocol. The output to the user 2 may be via a display on the pipe joint applicator with a control device 100, or via smartphone, or via a nearby or remote printer, or by transmitting and storing the data to a nearby or remote computer 400, such as via smartphone.

The pipe joint applicator with a control device 100 for process control means 200 for controlling the process parameters 210 to be delivered to a pipe joint 1 to be produced for controlling the controllable means for producing a permanent and/or detachable pipe joint 6, 6', 7, 7' of two pipe elements 4, 5 by means of a sleeve 3 3', comprises a means for actual value detecting 300 which detects at least one actual value of the process parameters 10, 10' and determines therefrom a target process parameter 110 with which the process control means 200 is controllable.

The pipe joint applicator with a control device 100 compares at least one actual value of the process parameters 10, 10' with at least one target process parameter 110.

The pipe joint applicator with a control device 100, when at least one actual value of the process parameters 10, 10' deviates from at least one tolerance value range of a target process parameter 110, outputs an alarm to a user 2 via an interface for input from the user and/or output to the user 20 and/or generates an error protocol and outputs the error protocol to the user 2 or stores the error protocol in a nearby or remote computer 400.

An example of a system for producing a joint between a first pipe element 4 and a second pipe element 5 via a sleeve 3, wherein the sleeve 3 comprises a plug-in sleeve with a clamping element according to European patent EP 3 120 064 B1, which has a clamping element that can be coupled in thrust in the longitudinal direction of the plug-in sleeve, wherein the clamping element is shaped and formed in such a way that it exerts its clamping action in the form of a snap-on function on the first pipe element 4 and the second pipe element 5 when an axial force is applied by means of a fluid pressure medium, comprises a process control means 200 in the form of a compressed air valve of a process control means 200 which is controllable by means of a target process parameter 110 and by means of which a process parameter 210 in the form of a controlled course of compressed air can be applied to the controllable means for producing a permanent and/or detachable pipe joint 6, 6', 7, 7' of the plug-in sleeve, whereby a clamping action in the form of a snap-on function can be exerted on the first pipe element 4 and the second pipe element 5, comprises means for actual value detection 300 of at least one of the actual process parameters 10, 10' in the form of a compressed air course at the controllable means for producing a permanent and/or detachable pipe joint 6, 6', 7, 7', which delivers the actual process parameters 10, 10' as electrical actual process parameters 310 to a control unit 105 of a pipe joint applicator having a control device 100 which determines the target process parameters 110 for controlling the process control means 200 from the electrical actual process parameters 310 and optionally comprises at least one comparison of an electrical actual process parameter 310 with at least one target process parameter 110 and, in the event of deviation from a defined tolerance band, outputs an alarm to the user 2 and/or outputs an error protocol or stores an error protocol.

FIG. 5 shows the principal nominal pressure curve in the cavity of a plug-in sleeve according to European patent EP 3 120 064 B1. This exemplary characteristic course of a process parameter 210 for controlling the controllable means for producing a permanent and/or detachable pipe joint 6, 6', 7, 7' can be detected as an actual value of the process parameter 10, 10' of the controlling compressed air by a pressure sensor of the means for actual value detecting 300, converted and forwarded as an electrical actual value of the process parameter 310 to the control unit 105 of the pipe joint applicator with a control device 100. For example, the process control means 200 generates a defined compressed air pulse as a process parameter 210 on the basis of a target process parameter 110, which is determined by the user 2 via the interface 120 or by the pipe joint applicator with a control device 100 by direct output of a target process parameter 110. This causes the pressure curve shown in FIG. 4 in the cavity of the plug-in sleeve, which can be detected, for example, at the connection point for applying a fluid pressure medium to the plug-in sleeve, or to a sleeve 3.

For example, a characteristic point pkrit can be used to assess the quality of the clamp connection. This point can alternatively or additionally be evaluated acoustically as a "crack point". Alternatively or additionally, the entire course of the pressure and or the acoustic emission or another actual value of the process parameter 10, 10' can be compared by comparison with a tolerance band of the target process parameter 110. In the event of deviation of the actual value of the process parameter 10, 10' of the controlling compressed air or the corresponding electrical actual value of the process parameter 310 from a defined tolerance band of the target process parameter 110, for example, an alarm is generated via the interface for input from the user and/or output to the user 20 to the user 2 and/or storage of an error protocol in the control unit 105 of the pipe joint applicator with control device 100 and/or in the nearby or remote computer 400.

| LIST OF REFERENCE SIGNS USED: | |
|---|---|
| 1 | pipe joint |
| 2 | user |
| 3, 3' | sleeve |
| 4 | first pipe element |
| 5 | second pipe element |
| 6, 6', 7, 7' | means for producing a permanent and/or detachable pipe connection |
| 10, 10' | actual value of process parameters |
| 20 | interface for input from and/or output to the user |
| 100 | pipe joint applicator with a control device |
| 105 | control unit |
| 110 | target process parameters |
| 120 | optional manual interface |
| 200 | process control means |
| 210 | process parameters |
| 300 | means for actual value detecting |
| 301, 302, | marking means |
| 303 | marking means |
| 304, 305 | means for position detection |
| 310 | electrical actual value of process parameter |
| 400 | computer |
| 410 | interface to the computer |

The invention claimed is:

1. A system for producing a joint between a first pipe element (4) and a second pipe element (5), comprising:
a sleeve (3), wherein the sleeve (3) comprises a plug-in sleeve with a clamping element, wherein the clamping element can be coupled in thrust in a longitudinal direction of the plug-in sleeve, the clamping element being shaped and formed such that, when an axial force is applied by means of a fluid pressure medium, the clamping element exerts a clamping action in the form of a snap-on function on the first pipe element (4) and the second pipe element (5);
a process control means (200) in the form of a compressed air valve controllable by means of a target process parameter (110), by means of which a process parameter (210) in the form of a controlled course of compressed air can be applied to controllable means for producing a permanent and/or detachable pipe joint (6, 6', 7, 7') of the plug-in sleeve wherein the clamping action in the form of the snap-on function can be exerted on the first pipe element (4) and the second pipe element (5); and
means for actual value detecting (300) an actual process parameter (10) in form of a compressed air flow at the controllable means for producing the permanent and/or detachable pipe joint (6, 6', 7, 7'), which delivers the actual process parameter (10) as an electrical actual value process parameter (310) to a control unit (105) of a pipe joint applicator with a control device (100) which determines the target process parameter (110) for controlling the process control means (200) from the electrical actual value process parameters (310).

2. The system according to claim 1, wherein the means for actual value detecting (300) further comprises a sensor for optical coding, and/or a sensor for text recognition, and/or an RFID reader for detecting material properties and/or dimensions of the pipe elements (4, 5) to be joined and/or of a sleeve (3, 3').

3. The system according to claim 1, wherein the means for actual value detecting (300) further comprises a GPS sensor for detecting a position of the pipe joint in three-dimensional space with respect to Earth, and/or a timer for detecting a time stamp.

4. The system according to claim 1, wherein the means for actual value detecting (300) further comprises means for detecting a user's personal identification data, a magnetic stripe reader, a bar code reader, and/or an input keyboard.

5. The system according to claim 1, wherein the means for actual value detecting (300) further comprises a proximity sensor,
wherein the proximity sensor is attached in a pipe connection region at an end of the first pipe element (4) and the second pipe element (5) and/or in the sleeve (3),
wherein the proximity sensor changes its position until a correct position is reached or when a correct position of a pipe element (4, 5) is reached, and
wherein the change in position can be detected as a further actual process parameter (10') inductively, capacitively, or magnetically via the proximity sensor within the means for actual value detecting (300).

6. The system according to claim 1, wherein the means for actual value detecting (300) compares the electrical actual value process parameter (310) with the target process parameter (110) and, in an event of a deviation from a defined tolerance band, issues an alarm to a user (2) and/or issues an error protocol and/or stores the error protocol.

* * * * *